Feb. 16, 1926.　　　　R. F. BLACK　　　　1,573,034

WEED CUTTER

Filed August 30, 1923

INVENTOR
Robert F. Black
BY John A. Naismith
ATTORNEY

Patented Feb. 16, 1926.

1,573,034

UNITED STATES PATENT OFFICE.

ROBERT F. BLACK, OF SAN JOSE, CALIFORNIA.

WEED CUTTER.

Application filed August 30, 1923. Serial No. 660,207.

*To all whom it may concern:*

Be it known that I, ROBERT F. BLACK, a citizen of the United States, and resident of San Jose, in the county of Santa Clara and State of California, have invented certain new and useful Improvements in Weed Cutters, of which the following is a specification.

This invention relates to a form of weed cutter particularly adapted for use in orchards and cultivated ground.

It is one object of the invention to provide a weed cutter in which the knives are reversible, thereby rendering the same self sharpening.

It is another object of the invention to provide a weed cutter provided with means for cutting a pathway for the travelling frame.

It is still another object of the invention to provide a structure wherein the draft arms are so constructed and attached as to prevent the accumulation of weeds thereon.

Finally, it is an object of the invention to provide a device that is simple in construction, economical to manufacture and highly efficient in its practical application.

In the drawing:—

Figure 1:
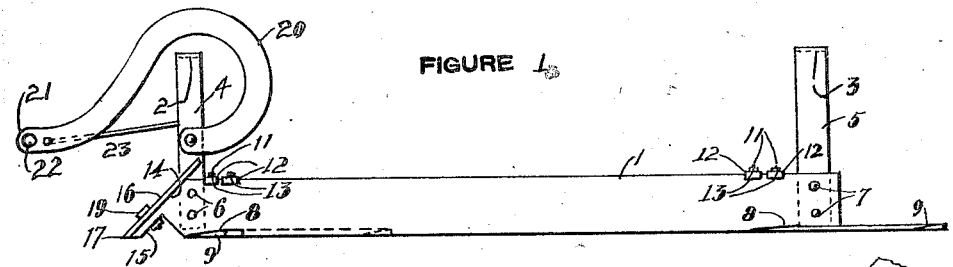
Figure 1 is a side elevation of the device.
Figure 2:
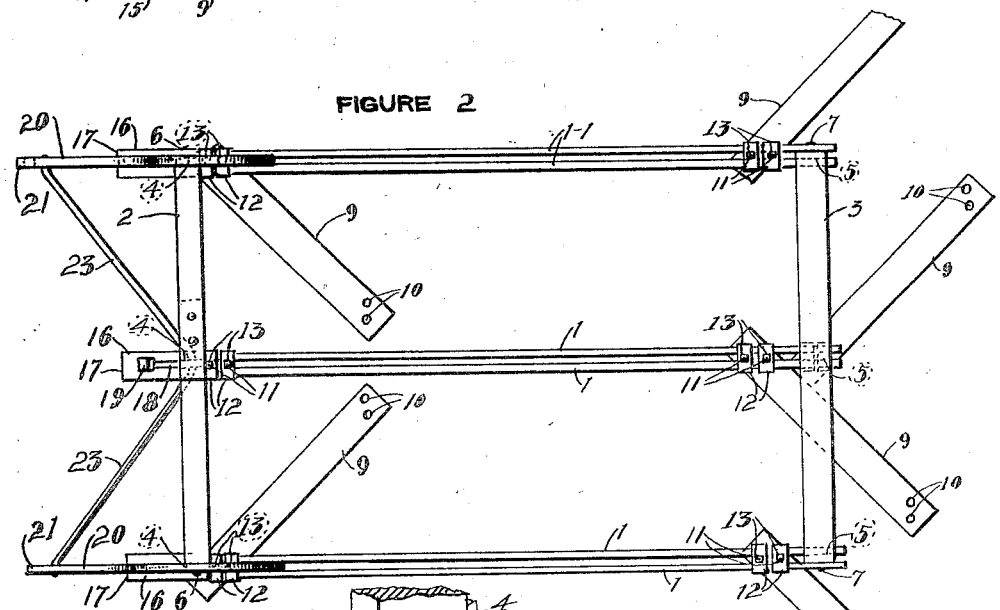
Figure 2 is a plan view of the same.
Figure 3:
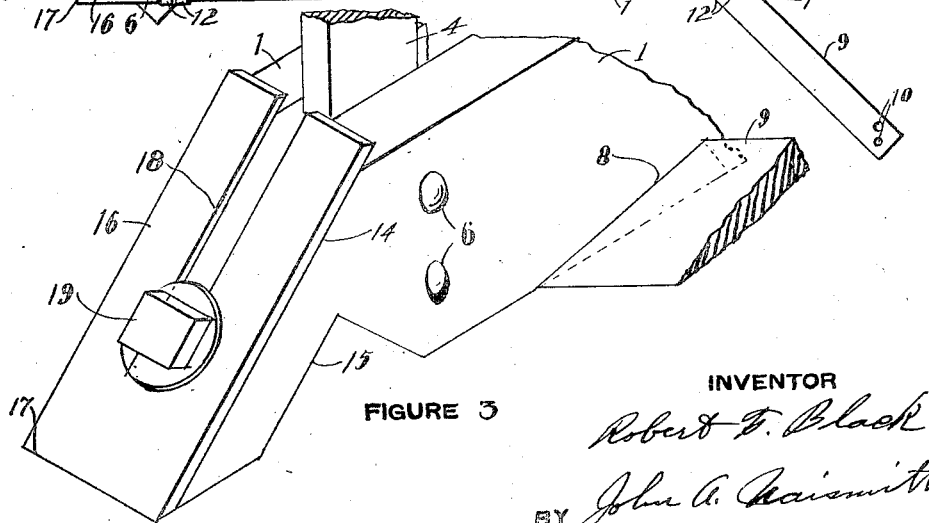
Figure 3 is an enlarged perspective view of a portion of the structure.

Referring more particularly to the drawing, I provide three parallel runners as at 1—1, 1—1, 1—1. Each runner 1—1 consists of a pair of bars oblong in cross section and arranged in parallel relation to each other and resting in a vertical plane on one of their longer sides.

At 2 and 3 respectively I show front and rear cross members, each member being provided with end legs and a center leg as shown at 4 and 5. The lower ends of these legs pass between their respective runner elements 1—1 and are bolted thereto as indicated at 6 and 7, thereby at the same time securing each pair of bars together in the desired position and properly spacing and securing the three runners as shown.

At spaced intervals in the bottom of each runner are formed recesses as indicated at 8, these being arranged at any desired angle to the said runners. In these recesses are positioned the several cutting blades 9 as shown, the recesses being of such a depth that the bottom surfaces of the several blades lie flush with the bottom edges of the runners. In each end of each blade are provided two orifices as at 10—10. When the blades are in position bolts 11—11 are inserted therethrough and between the two elements forming the runner and thence through a pair of clips as 12—12 straddling the upper edges of the runner where they are secured by nuts 13. By means of this construction the blades are securely bound to their respective runners and the shoulders of these recesses effectively brace them against slipping. When the blades become dull it is only necessary to remove the bolts 11, reverse the blades and bolt them in position again and the cutting edge is in position for wearing away from the opposite side and maintaining the required sharpness.

The front end of each runner is bevelled as shown at 14, and a notch is cut out of its under edge with one side thereof parallel to the bevelled surface 14 as shown at 15. At 16 is shown a plate having a cutting edge 17 and having a slot formed longitudinally therein as at 18. One of these plates 16 is positioned on each bevelled surface 14 as shown and held in position by a bolt 19. As the cutting edge wears away the bolt is loosened, the plate dropped a distance and the bolt tightened up again, or the plate may be reversed.

To the lower portion of each of the forward side legs 4 is pivotally connected a goose-neck element 20 the same curving backwardly and upwardly from said connection, thence upwardly and forwardly, and thence downwardly and forwardly to a terminal point 21 provided with an orifice 22 in which a draft chain may be secured. These two elements 20 are braced at their forward ends by rods 23 secured thereto and to center forward leg 4.

When the device is assembled as described and drawn forwardly over the ground the plates 16 cut the weeds immediately in front of the runners 1—1, and the blades 9 cut the weeds between the runners and a distance either side thereof close to the ground. The blades 9 are in the form of an isosceles triangle in cross section, the upper and lower sides forming an acute angle as they join to form the cutting edge. Since the reversal of the blades alternately subjects the two sides to frictional contact with the ground the cutting edge is alternately worn away from both sides and consequently becomes self-sharpening.

By providing the goose-neck construction at 20 the draft is applied where desired yet no opportunity is offered for weeds to accumulate and pack as would be the case if the hitch were made directly to the leg 4.

It is to be understood, of course, that while I have herein shown and described one specific embodiment of my invention, changes in form, construction and method of operation may be made within the scope of the appended claim.

I claim:

In a weed cutter, a runner comprising a pair of parallel, vertically arranged elements having angularly arranged recesses formed in the bottom thereof in the form of a triangle and extending crosswise of said runner, one side of said triangle lying flush with the bottom of said runner, cutting blades arranged in said recesses and having transverse cross-sections similar thereto, bolts piercing one end of each of said blades and extending upwardly between said elements, and plates arranged on said bolts and engaging the upper edges of said elements, said blades having similarly spaced but oppositely arranged orifices formed in their opposite ends whereby to permit their reversal in said recesses.

ROBERT F. BLACK.